United States Patent [19]
Calim

[11] 3,828,572
[45] Aug. 13, 1974

[54] MACHINE FOR PRODUCING FROZEN CONFECTIONS
[76] Inventor: Thomas F. Calim, P.O. Box 158, Jackson Center, Ohio 45334
[22] Filed: May 2, 1973
[21] Appl. No.: 356,400

[52] U.S. Cl.................... 62/340, 62/342, 251/304
[51] Int. Cl. ............................................ F25c 7/10
[58] Field of Search ............... 251/304; 62/340, 342

[56] References Cited
UNITED STATES PATENTS
2,969,219   12/1954   Barksdale ...................... 252/304 X
3,656,316   4/1972   Stock ..................................... 62/70

*Primary Examiner*—William E. Wayner
*Attorney, Agent, or Firm*—Palmer Fultz, Esq.

[57] ABSTRACT

A machine for producing frozen confections such as ice creams or the like, wherein liquid mix is delivered from a storage tank through a freezing chamber to a draw-off valve from which the frozen mix is dispensed to cones or cups. The machine is characterized by a draw-off or dispensing valve construction that comprises relatively thin discs positioned in intimate relationship with the freezing chamber so as to maintain the valve components and mix passing through in a frozen state. The dispensing valve construction is further characterized by a structural arrangement that provides large volumetric discharge of frozen mix at the threshold of opening of the valve.

2 Claims, 14 Drawing Figures

FIG. 1
FIG. 2
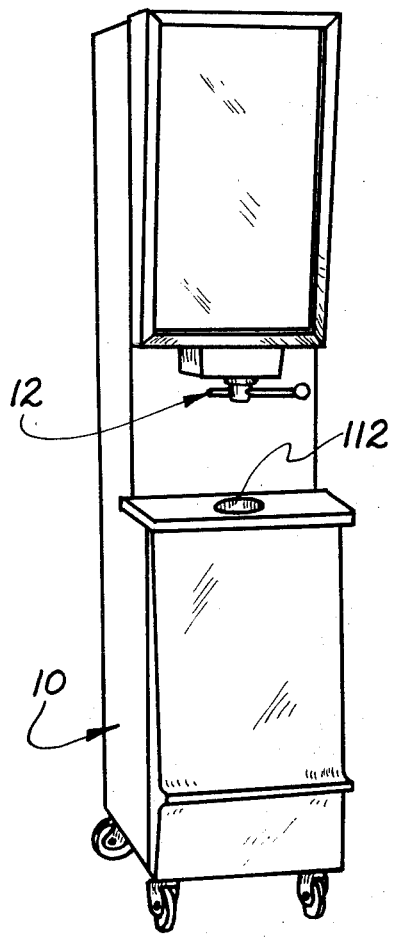
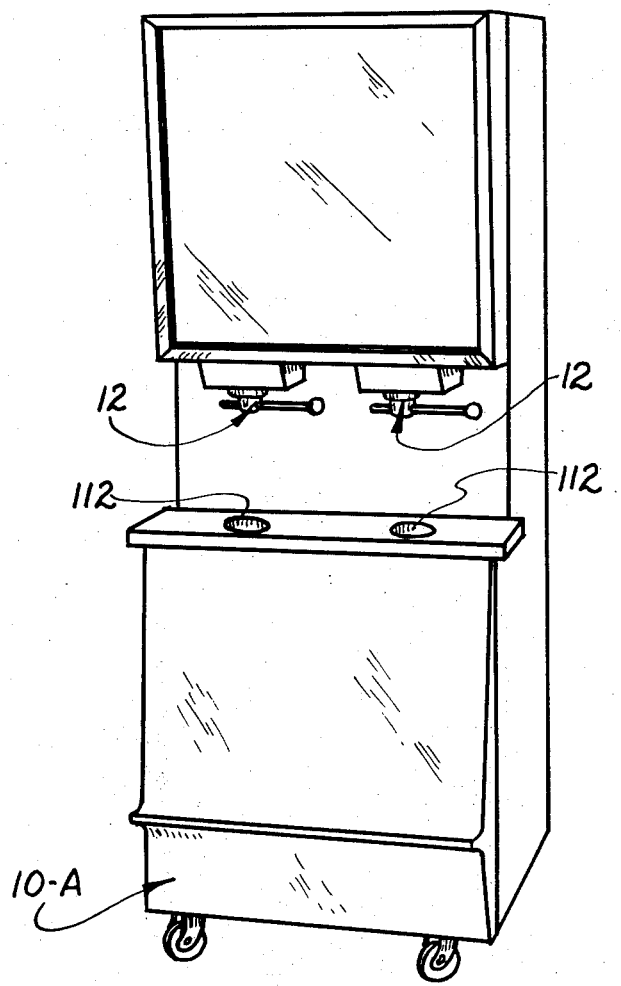

FIG. 6-A.

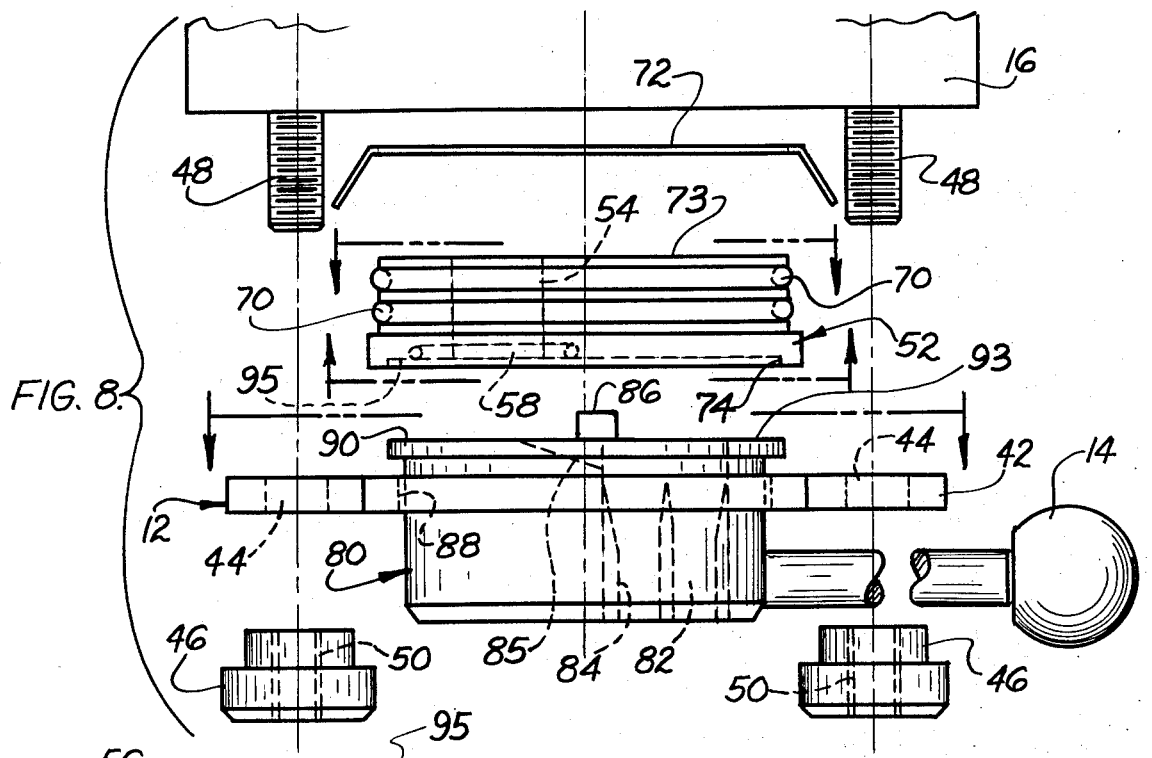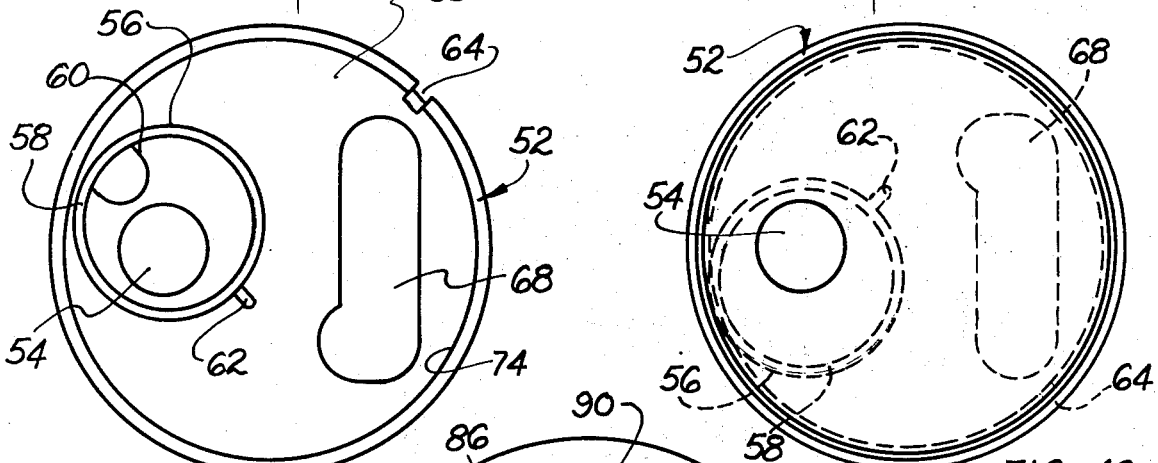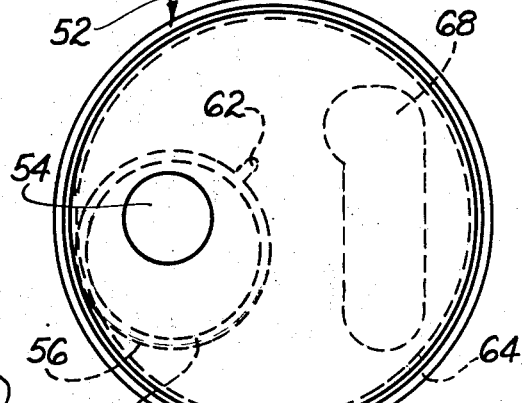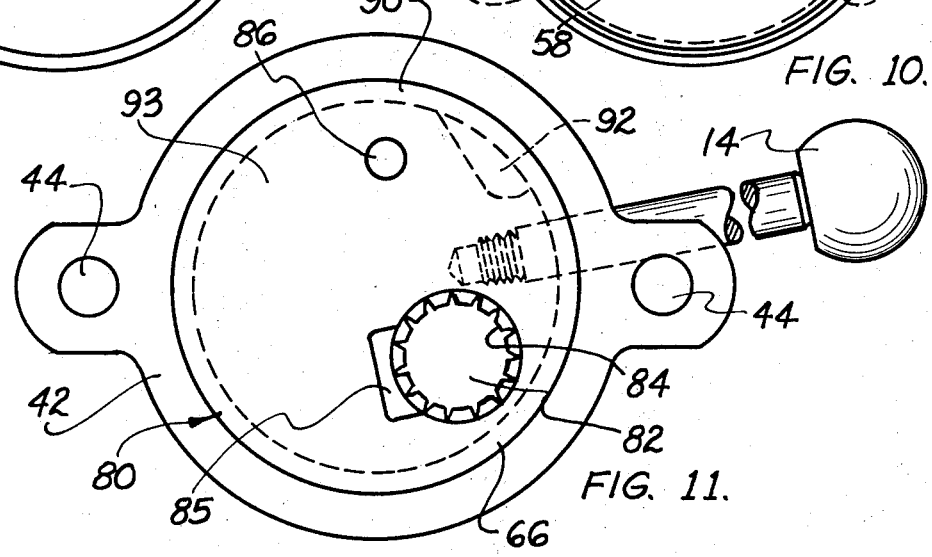

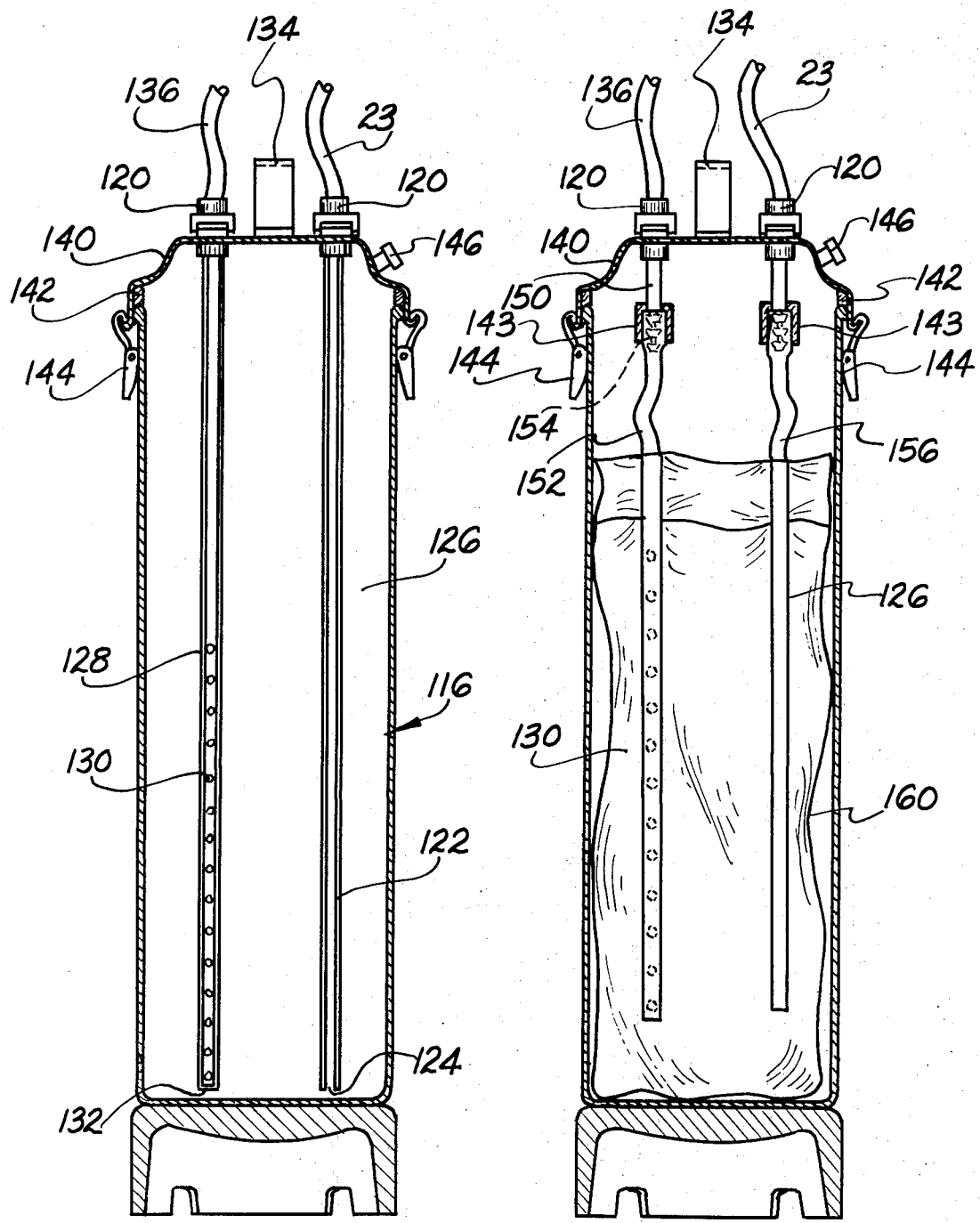

MACHINE FOR PRODUCING FROZEN CONFECTIONS

BACKGROUND OF THE INVENTION

This invention relates generally to machines for producing frozen confections such as soft ice cream or the like.

In general, the machine of the present invention is of the type used by soft ice cream vendors and sandwich shoppes for freezing mix used to fill cones or cups with soft ice cream, the portions of the ice cream being released from the dispensing valve of the machine immediately prior to serving the customer.

Machines of this general type comprise an upright frame, the lower portion of which includes a storage tank for one or more pressurized mix tanks which are filled with a liquid mixture. Machines of this type further include a freezing chamber to which the mix is delivered from the previously mentioned storage tank and wherein the mix is further chilled to stiffen its consistency of a soft ice cream state.

The soft ice cream is released from the freezing chamber by means of a draw-off or dispensing valve which is operated by the vendor to dispense servings of frozen mix to the cone or cup in controlled amounts.

With machines of this type a problem has been present in the art in that the above mentioned freezing chambers have required internal agitating or mixing apparatus stirring the mix as it progresses through the freezing chamber. Such mixing apparatus inherently requires complex and expensive driving means in the form of gear reducers and electric motors together with control circuitry for operating same.

In machines of this general type the problem has been present in the art in that the above mentioned dispensing valves have caused problems both with respect to maintaining sanitation as well as effecting the release of the frozen mix so as to eliminate what may be termed a "ribbon effect" which would occur at the threshold of the opening of the release valve.

Still another problem has been present with the dispensing valves in that they would not be sufficiently closed due to the inherent remoteness of the internal valve parts from the refrigeration effect of the freezing chamber.

SUMMARY OF THE INVENTION

In accordance with the present invention the machine is provided with a novel dispensing or draw-off valve which is constructed so as to be maintained at all times at relatively low temperature due to intimate contact of the moving parts with the heat exchanger of the freezing chamber. This eliminates the occurrence of residual in a relatively warm valve. Such has been a serious problem, with respect to sanitation since with warmer valves of the prior valves that operate at warmer temperatures the small residual mix left within the valve at the end of the days operation would provide an undesirable and inefficient environment for the growth of harmful bacteria.

As another aspect of the present invention, the novel dispensing valve comprises a novel disc rotary valving arrangement wherein separate valve passages can be co-axially aligned and with the occurrence of the threshold of opening certain of the passages are provided with a novel threshold ramp construction which eliminates any ribbon effect or gradual release of frozen mix at threshold, which ribbon effect would preclude the operator from dispensing a column of the frozen mix around the edge of the ice cream cone.

Further objects and advantages of the present invention will be apparent from the following description, reference being had to the accompanying drawings wherein preferred forms of embodiments of the invention are clearly shown.

BRIEF DESCRIPTION OF THE DRAWINGS

FIG. 1 is a perspective view of a single unit ice cream machine constructed in accordance with the present invention;

FIG. 2 is a perspective view of a multiple unit ice cream machine constructed in accordance with the present invention;

FIG. 6-A is a plan view of a baffle element comprising a portion of the heat exchanger of FIG. 4;

FIG. 8 is an exploded view of the dispensing valve comprising a portion of the apparatus of the preceding figures;

FIG. 9 is a bottom elevational view of an upper body portion comprising a portion of the valve of FIG. 8;

FIG. 10 is a top elevational view partially in section of the upper body portion of FIG. 9;

FIG. 11 is a top elevational view of a lower body portion of FIG. 9;

FIG. 12 is a side sectional view of a mix container constructed in accordance with the present invention with the section being taken along a vertical plane through the center line of the mix container; and FIG. 13 is a side sectional view of a modified mix container constructed in accordance with the present invention, with the section being taken along a vertical plane through the centerline of the container.

DESCRIPTION OF PREFERRED EMBODIMENTS

Referring in detail to the drawings, FIG. 1 illustrates a single station machine for dispensing ice cream or the like whereas FIG. 2 illustrates a dual machine for dispensing ice cream portions simultaneously from two stations.

Figure 3:
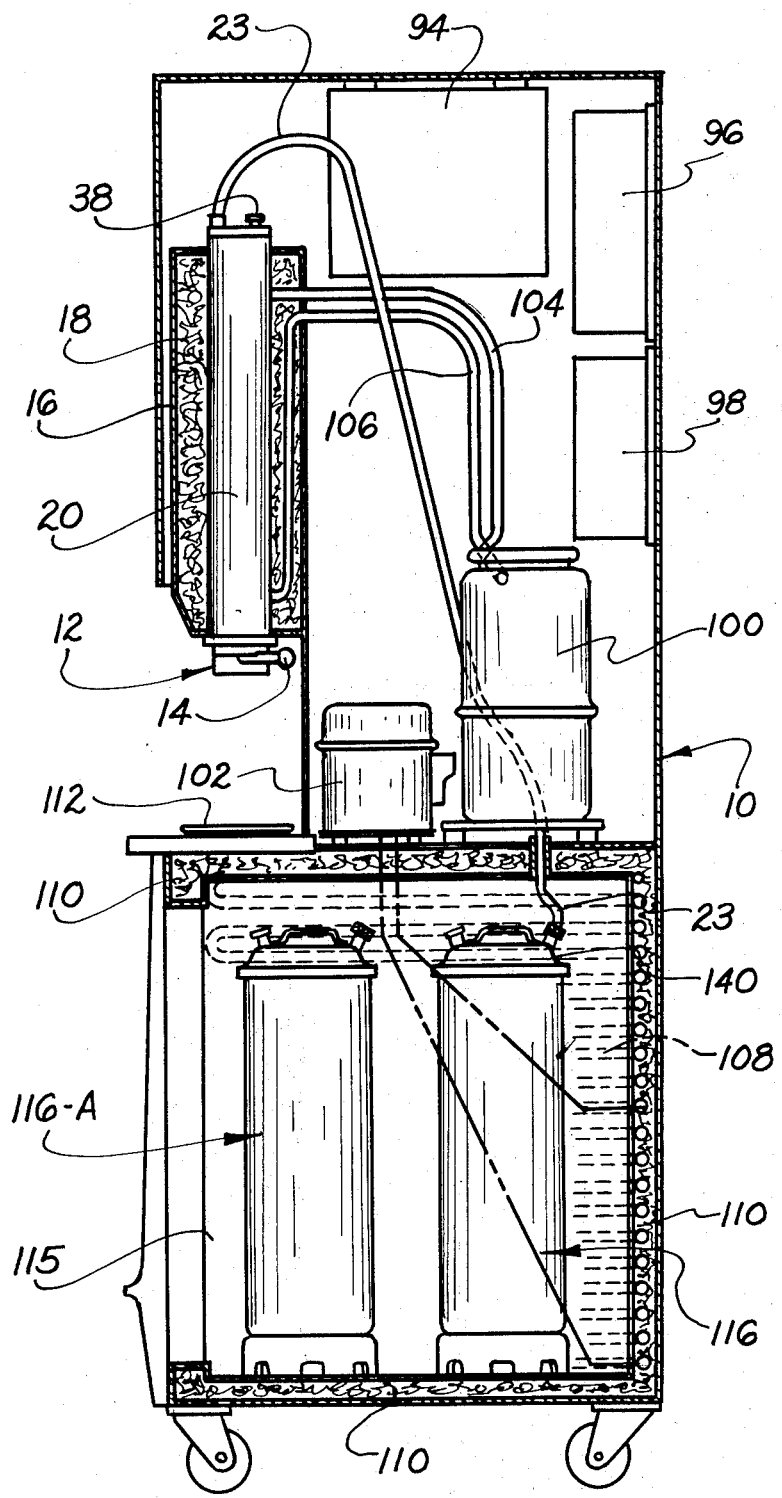
FIG. 3 is a partial side sectional view of a typical unit of one of the machines of the preceding figures, the FIG. 4 is a cut away showing of the mix freezing heat exchanger and the dispensing valve assembly.

Referring next to FIG. 3 which is a side sectional view through one of the stations of the machines of the preceding figures, it will be noted that the apparatus comprises an upright frame means 10 that includes side walls that form a refrigerated storage compartment 115. The storage compartment serves to hold an active mix container indicated generally at 116 as well as a standby mix container 116-A.

Figure 4:
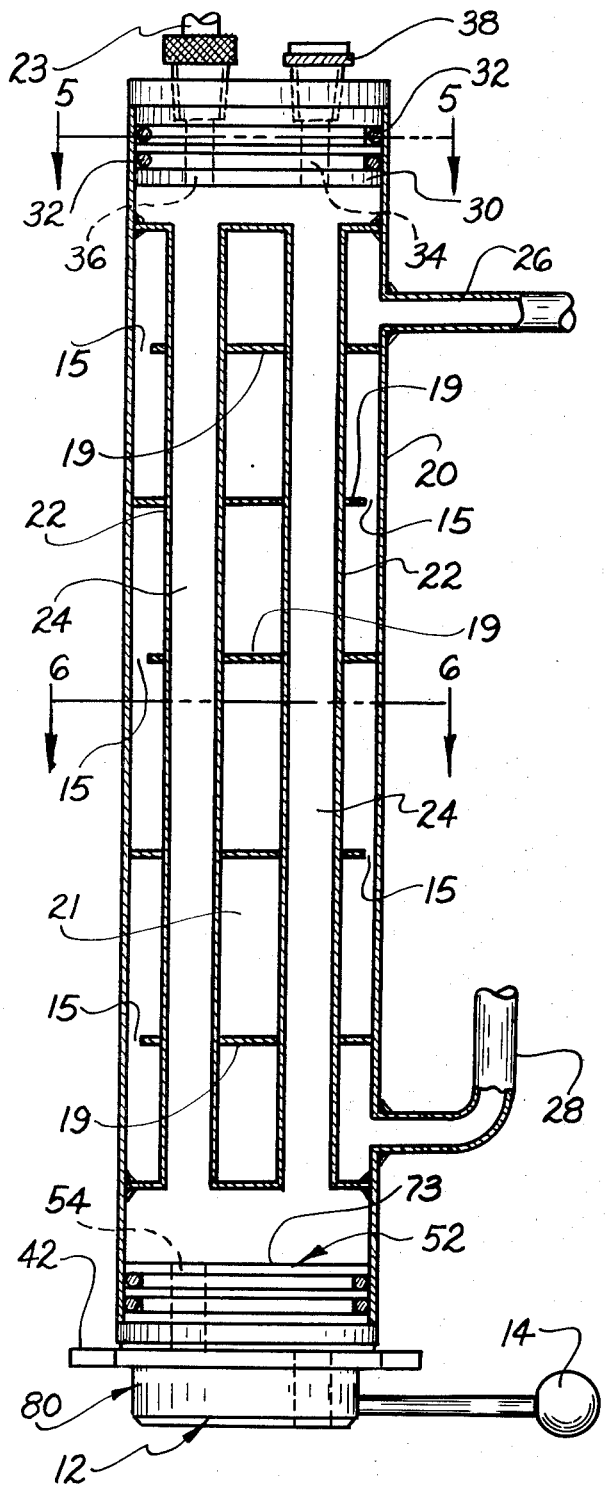
Figure 5:
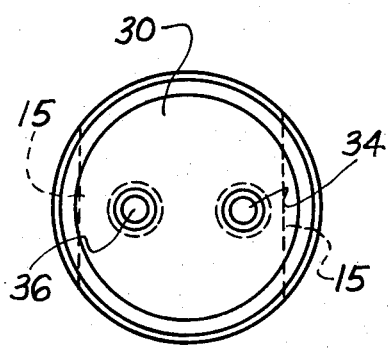
FIG. 5 is a top sectional view of the apparatus of FIG. 4, the section being taken along the line 5—5 of FIG. 4.

With continued reference to FIG. 3 active mix container 116 releases liquid mix via a mix delivery conduit 23 which is connected to the inlet passage 36, FIG. 4, of a heat exchanger or freezing chamber indicated at 20.

The mix container is pressurized by a suitable gas such as Freon 115, nitrous oxide, or comprssed air via line 136 which communicates with a pressurized source of gas, not illustrated.

With continued reference to FIG. 3, storage compartment 115 includes wall insulation indicated at 110 and is cooled by a cabinet refrigeration system including refrigerant coils 108, storage compressor 102, and a storage condensor 96. Such refrigeration system for the storage compartment is of a conventional type and is provided with the usual refrigeration controls for maintaining a constant preset temperature in the storage compartment.

Referring again to the novel cooling chamber indicated at 20 in FIG. 3, surrounded by a protective jacket 16 with the space between the chamber and jacket filled with suitable insulation consisting of fiberglass or the like.

As shown in FIG. 4, the heat exchanger comprises a plurality of longitudinally extending tubes 22 serving to convey the mix from inlet passage 36 in intimate heat relationship with a flow of refrigerant.

Refrigerant for the mix deliverant tubes 22 is supplied by a compressor 100, FIG. 3, via line 104 to exchange passage 21, coolant being returned by line 106. It should be mentioned that a condensor 98 is included in the refrigeration system for the heat exchanger means.

Here again the refrigeration system 100 for the coolant is provided with refrigeration controls of a conventional type for maintaining a preselected constant temperature for the coolant chamber 21 of the heat exchanger means.

It should be mentioned that the mix delivery tubes 22 consist of a plurality of passages 24 of relatively small diameter whereby the flowing refrigerant in chamber 21 intimately contacts a relatively large outer tube surface area, and further so that the heat transfer path from the center of the column of flowing mix in tubes 22 to and through the tube walls will be relatively short thereby providing highly efficient refrigeration of flowing mix without the need of mechanical mixing apparatus.

Figure 6:
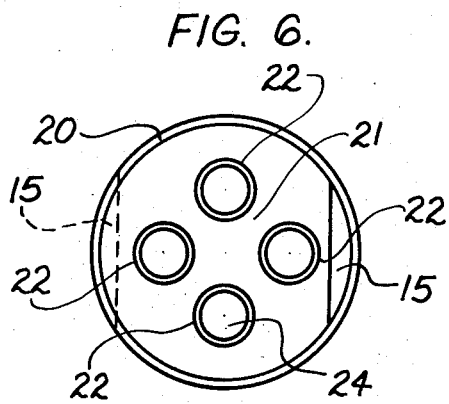
FIG. 6 is a top sectional view of the apparatus of FIG. 4, the section being taken along the line 6—6 of FIG. 4.
Figure 7:
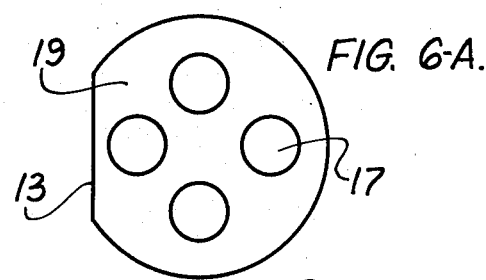
FIG. 7 is a bottom elevational view of the dispensing valve comprising a portion of the apparatus of FIG. 4.
Figure 7:
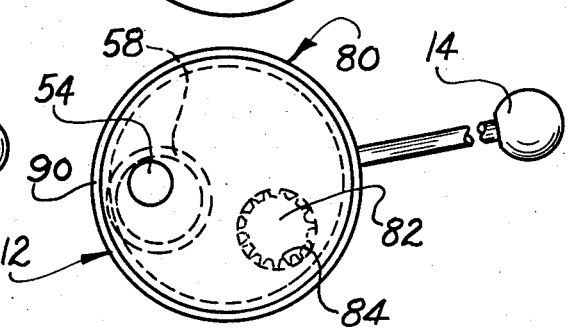

Referring particularly to FIG. 6-A the heat exchanger of FIG. 4 further includes a plurality of longitudinally spaced baffles 19 each of which is provided with an edge 13 that is spaced from the inner wall of the heat exchanger to form the staggered passages 15. Such baffles 19 are mounted on the four tubes 22 with such tubes being extended through respective holes 17 best seen in FIG. 6-A. Such baffles serve to divert the flow of refrigerant laterally so as to increase the length of the flow path and therefore the magnitude and efficiency of heat transfer between the flowing refrigerant and the mix. Such baffles further function to eliminate hot spots along the length of the heat exchanger.

Reference is next made to FIGS. 8 through 11 which illustrate in detail the novel mix dispensing valve of the present invention. Such valve comprises an upper body portion 52 forming a stationary valve plate which is inserted into the lower end of heat exchanger means 20 such that the upper surface 73 of upper body portion 52 is in direct heat exchange relationship with the frozen mix over a relatively large area.

With this arrangement upper body portion 52 is sufficiently refrigerated over a large heat transfer area such that valve 12 is efficiently refrigerated.

With continued reference to FIGS. 8 through 11 upper body portion 52 includes a plurality of O-ring seals 70 which prevent the leakage of mix between the outer wall of upper body portion 52 and the inner surface of the outer wall of heat exchanger jacket 20.

With continued reference to FIGS. 8 through 11 dispensing valve 12 further includes a lower body portion indicated generally at 80 which is journaled in a mounting bracket 42 forming a rotary valve plate such that the lower body portion can be rotated with respect to the upper stationary body portion 52 by accurate manipulation of a handle 14. Lower body portion 80 includes a peripheral shoulder 90 which provides a bearing that movably engages the inner surface 74 on the bottom of upper body portion 52.

Lower body portion 80 further includes an upper surface 93 which being slideable engages a lower surface 95 on upper portions 52 and the two body portions serve to prevent the release of mix from the heat exchanger when the two body portions are manipulated to the closed position illustrated in FIG. 8.

The frozen mix is released by the valve body portions when handle 14 is actuated to bring lower body valve passage 82 into alignment with upper body valve passage 54 with an O-ring 58 being mounted in a groove 56 in the lower surface 95 of upper body portion 52 with such O-ring 58 being at all times in.

As is best seen in FIG. 9 lower body portion 80 is provided with a ramp or downwardly sloping groove 85 in its upper surface 93 such ramp being provided to prevent "ribbon effect" at the threshold of the opening of the valve. That is to say, when lower portion 80 is rotated so as to align the passages and open the valve, when the threshold of opening is reached, then ramp 85 allows a relatively high volumetric flow of mix at the outset of the valve opening thereby immediately providing a fully formed full diameter stream of frozen mix through the lower outlet passage 82. This large initial delivery is important in instances where the column of frozen mix is being disposed on the lip of an ice cream cone in which instance it is important to initially dispense a large donut shaped bottom layer of mix which will stay on the top of the lip of the cone rather than having a small ribbon of mix dribble down into the cone.

Referring again to O-ring 58 and the annular groove 56 in which it is mounted, a small radial groove 62 is provided communicating with the bottom of the groove at the outer edge of the O-ring with such groove 62 serving to release any excessive pressure imposed on the O-ring by the pressurized mix and thereby eliminating the possibility of the O-ring being forced out of its annular groove 56.

Referring again to FIGS. 8, 9, and 10 the accurate movement of the lower body portion 80 is limited by a protrusion or stop 86 providing on upper surface 93 and extended into a slot 68 formed in the lower surface 95 of top body portion 52. It will be understood that the ends of such slot will arrest rotation of the lower body portion when stop 86 comes in contact therewith, thereby arresting rotation of lower body portion 80 at the proper position for alignment of valve passage 54 and 82, as seen in FIG. 8, dispensing valve 12 is preferably provided with a head removing member 72 which provides grips for pulling upper body portion 52 out of jack 23 when it is necessary to remove it for cleaning or repair.

It will further be seen that valve mounting bracket 42 is secured to the bottom of cooling chamber 16 by means of the nuts 46 provided with threaded holes 50 with such nuts being screwed onto the studs 48.

With reference to FIG. 11 lower outlet passage 82 is preferably provided with serations 84 at the outlet end thereof which functions to form the flow of frozen mix with a serated outer surface.

Referring next to FIG. 13 this embodiment represents a modified apparatus and method for handling, agitating and dispensing mix to the cooling chamber 116 of FIG. 2. Here the mix 126 is supplied by the dairy in disposable flexible bags 160, formed of suitable plastic material. Such bags include gas inlet tubes 152 and mix discharge tubes 156 which are closed by sterilized caps by the dairy. As was the case with the embodiment of FIG. 12, the gas inlet tube 152 is provided with a plurality of longitudinally spaced gas discharge orifices 130 which agitate the mix bath 126 and thereby maintain its homogeneity.

In operation of the embodiment of FIG. 13, the operator needing a new container of mix need only unlatch the clamps 144, lift lid 140, and disconnect the empty flexible bag 160 at the nipple and hose connections 150–154. The empty bag 160 is then removed from container 116 and a new filled flexible bag is next placed in the container and connected to lines 136 and 23 at the nipple connections 150–154.

In accordance with the present invention, the above mentioned gaseous mixture functions to agitate the mix bath 126 and thereby maintain the mix in a homogeneous state. As a result the need for stirring apparatus in the cooling chamber section is eliminated and the mix can be delivered through the relatively small and thermally efficient mix delivery tubes 22 previously described.

Agitation of mix bath 126 is effected by providing orifice means 130 through the wall of gas delivery tube 128, FIG. 4, with the result that the pressurized gaseous mixture from line 23 is released in jet streams throughout the bath of mix thereby maintaining same in a mixed homogeneous state.

It should be mentioned that in the operation of prior machines it has been necessary for the vendor to shake the mix container in a special shaking machine prior to installation in the machine which of course is time consuming and necessitates extra equipment in the form of a shaking machine.

Reference is next made to FIGS. 3 and 12 which illustrate a novel mix tank apparatus which functions in a unique manner to agitate the mix and deliver same to the previously described cooling chamber 16.

As seen in FIG. 12, one modification comprises a mix container 116 which includes a lid 140 that can be removed at the lid latches 144 whereby the container 116 can be cleaned, sterilized and refilled with mix when it is returned empty to the dairy.

Container 116, FIG. 12, is mounted in refrigerated compartment 115 with a mix outlet tube 122 connected to mix delivery line 23 at a lid fitting 120, said outlet tube including a mix inlet 124. Container 116 further includes a gas inlet tube 128 having a closed lower end 132 and an upper end connected to a gas delivery line 136. Line 136 is in turn connected to a source of pressurized gas not illustrated, with a preferred gas being a mixture of Freon 115 and nitrous oxide ($N_2O$). These gases have F.D.A. approval for use in aerosol foods, and such have been commonly used as a propellant for dispensing foods from aerosol cans.

It will now be understood that with the disposable bag embodiment of FIG. 13 there is the further advantage that the metal mix container 116 need not be returned to the dairy for refill, nor is it necessary to sterilize the metal container since the inner bag 160 is supplied by the dairy in a sterilized condition.

Referring again to FIG. 13, it should be mentioned that as a further modification the flexible bag embodiment could be pressurized externally by the admission of compressed air at the air inlet 146 which would be connected to a source of compressed air, not illustrated. In such instance the product would be forced out in the same manner as use of pressure in the bag. However, the mix 126 would not be subjected to the advantageous mixing effect from the jets of compressed gas released from orifices 130 in tube 152 in the manner previously described. The other advantages of the disposable bag system would however be realized.

While the forms of embodiments of the present invention as herein disclosed constitute preferred forms, it is to be understood that other forms might be adopted.

I claim:

1. A machine for dispensing soft ice cream or the like comprising, in combination, frame means; storage means for a mix to be dispensed from said machine; heat exchanger means for chilling said mix as it is dispensed from said storage means, said heat exchanger means including an outlet; and valve means for dispensing mix from said machine, said valve means including at least two relatively thin discs, intimate with the cold of said heat exchanger, said discs including confrontable passages with cut-off edges; a pressure responsive seal between confronting surfaces of said discs and in surrounding relationship with certain of said confrontable passages; said pressure responsive seal including a pressure relief means for reducing any excessive pressure imposed on said seal by said mix.

2. A machine for dispensing soft ice cream or the like comprising, in combination, frame means; storage means for a mix to be dispensed from said machine; heat exchanger means for chilling said mix as it is dispensed from said storage means, said heat exchanger means including an outlet; and valve means for dispensing mix from said machine, said valve means including at least two relatively thin discs, intimate with the cold of said heat exchanger, said discs including confrontable passages with cut-off edges; said discs including confronting surfaces, one of said surfaces including a depression for the free egress of mix to one of said confrontable passages upon relative movement between said surfaces.

* * * * *